United States Patent [19]

Loudon

[11] Patent Number: 4,547,720

[45] Date of Patent: Oct. 15, 1985

[54] INDUCTION MOTOR START-STALL DETECTION APPARATUS AND METHOD

[75] Inventor: Stuart D. Loudon, Pretoria, South Africa

[73] Assignee: Newelec Pretoria Ltd., South Africa

[21] Appl. No.: 540,477

[22] Filed: Oct. 11, 1983

[30] Foreign Application Priority Data

Oct. 8, 1982 [ZA] South Africa ............. 82/7366

[51] Int. Cl.$^4$ .................................. H02P 5/42
[52] U.S. Cl. ............................. 318/782; 318/794; 361/29
[58] Field of Search ............. 361/30, 23, 24, 28, 361/29; 318/430, 431, 434, 728, 782–788, 794, 781

[56] References Cited

U.S. PATENT DOCUMENTS

| | | | |
|---|---|---|---|
| 3,600,657 | 6/1970 | Pfaft | 361/30 |
| 3,727,103 | 4/1973 | Finch et al. | 361/30 |
| 4,016,468 | 4/1977 | Graf | 318/434 |
| 4,194,145 | 3/1980 | Ritter | 318/794 |
| 4,251,846 | 2/1981 | Pearson et al. | 361/30 |

Primary Examiner—E. A. Goldberg
Assistant Examiner—A. Evans
Attorney, Agent, or Firm—Armstrong, Nikaido, Marmelstein & Kubovcik

[57] ABSTRACT

A stall detection method for electric induction motors and apparatus utilized the stator current and voltage phase difference as proportional to percentage synchronous motor speed, and detects a stall condition from this speed as a parameter of motor movement. The invention includes differentiating the phase difference to obtain motor acceleration as a parameter potentially indicative on its own, or in conjunction with phase difference, of a motor stall condition.

14 Claims, 4 Drawing Figures

INDUCTION MOTOR START-STALL DETECTION APPARATUS AND METHOD

INTRODUCTION

This invention relates to a stall detection apparatus, and a method of detecting stall conditions for electric induction motors.

BACKGROUND OF THE INVENTION

For heavy duty hoisting or driving, a wound rotor induction motor is often used with the motor usually arranged to start at maximum torque. For general purpose applications, a variety of types of squirrel cage motors are used. Particularly in the former case, but also in the latter, it is important to be able to protect a motor from a stall condition, especially at motor start up when heavy current can be drawn by a motor.

As far as applicant is aware, the existing start-stall and stall protection designs allow the full starting current to be provided to the machine on startup, irrespective of whether the machine is moving or stationery. This results in considerable wastage of power, as well as the stressing of the motor to its full overload limit before a stall trip protection operates.

Generally, if it is desired to see if an induction motor is in fact moving, a tache generator on the motor shaft, or other shaft sensor, is used to indicate rotation.

OBJECT OF THE INVENTION

It is an object of this invention to provide a stall detection method and apparatus for use on induction motors.

SUMMARY OF THE INVENTION

In accordance with this invention there is provided a method of detecting a stall condition in an electric induction motor comprising monitoring the phase difference between the stator current and voltage and activating a stall condition signal if the phase difference is larger than a predetermined maximum.

Further features of the invention provide for the inclusion of the steps of activating a timing means if the said predetermined maximum is exceeded; activating the stall condition signal if the predetermined maximum persists for a predetermined period measured by the timing means; and, resetting the timing means if the said predetermined maximum does not persist for the predetermined period.

There is still further provided for the: detecting a start up condition of the motor if load current demand increases from a predetermined value less than motor overload maximum, to the said overload maximum within a predetermined time; activating a timing means on detection of a start up condition; determining whether the phase difference as representative of percentage synchronous speed of the motor decreases from a start-up value to value just above the said predetermined maximum within a predetermined period measured by the timing means, the said value and time period being selected to represent a safe operating percentage of synchronous speed reached within an allowable time; and, activating the stall condition signal if the said value is not reached within the time period.

An important feature of the invention includes electronically determining the rate of change of the said phase difference, and determining whether it is less than a predetermined minimum value which is selected to represent a desired minimum motor acceleration limit, activating a second stall condition signal if the said rate of change is less than the predetermined minimum value, and, activating a final stall condition signal if both the second and original stall condition signals are present.

In this latter case provision is also made for maintaining an electrical signal record of motor thermal load for the time being by accumulating and reducing a thermal memory, utilizing the thermal load signal to continously vary the desired minimum motor acceleration limit such that the greater the thermal load, the faster the desired minimum acceleration and vice versa.

Furthermore, the desired minimum motor acceleration limit can be varied in accordance with the phase difference signal, such that the lesser the phase difference the faster the desired minimum acceleration.

Preferably selective switching between the continous variance of the minimum acceleration with phase difference, and a fixed predetermined minimum acceleration is provided.

There is still a further feature of the invention provides for variation of the motor acceleration limit with phase difference is in two different linear proportions, selected to approximate a graph of phase displacment against percentage synchronous speed for the motor.

Still further in accordance with this invention there is provided stall detection apparatus for an electric induction motor comprising a phase comparator for producing an output signal which is proportional to phase difference between stator current and voltage, and a level detector for producing a stall condition signal if the output signal represents a phase difference greater than a predetermined maximum.

A feature of the invention provides for the apparatus to include timing means connected to be activated by the stall condition signal, and adapted to produce a final stall condition signal if the first stall condition signal persists for a predetermined period measured by the timer, there being resetting means to reset the timer if the said first signal does not so persist.

Alternatively, the apparatus includes a motor start detector adapted to produce a start signal if motor load current demand increases from a predetermined value less than the motor overload maximum, to the said overload maximum within a predetermined time; a timing means connected to be activated by the start signal; the level detecting means being adapted to be disabled by the timing means for a predetermined period, the predetermined maximum phase difference and time period being selected to represent a safe operating percentage of synchronous speed reached within an allowable time.

Preferably, the apparatus provides for a differentiating means connected to receive the phase difference output signal and produce a signal representing rate of change of phase difference; further level detecting means for activating a second stall condition signal if the rate of change signal is less than a predetermined minimum selected to represent a desired minimum motor acceleration limit, and, logic means for activating a final stall condition signal only if both the first and second stall condition signals are present.

A still further feature of the invention provides for the apparatus to include a thermal memory for accumulating and reducing a record of the thermal load for the time being of the motor and producing a signal representing the record, this signal being connected to continously vary the desired minimum motor acceleration level such that the greater the thermal load the faster the desired minimum acceleration limit and vice versa.

The apparatus also makes provision for the variation of the desired minimum motor acceleration limit with the phase different signal by connection thereof to the limit setting, such that the lesser phase difference the faster the desired minimum acceleration limit.

Switching means is also provided to optionally enable switching of the desired minimum acceleration between variance with phase displacement and a fixed predetermined minimum acceleration limit.

A particular feature of the variation of motor acceleration with phase difference, is the provision for this to be adapted to be in two different linear proportions, selected to approximate a graph of phase displacement against percentage synchronous motor speed.

BRIEF DESCRIPTON OF DRAWINGS

Preferred embodiments of the invention are described below by way of example only, and with reference to the accompanying drawings, in which.

DETAILED DESCRIPTION OF THE DRAWINGS

In an induction motor, the percentage of synchronous speed reached during an acceleration phase from startup, can be determined from the phase difference between the rotor current and voltage. The stator reactance is normally constant, but the rotor reactance is reflected to the stator, and thus gives a variable stator reactance during startup, until synchronous speed is reached when it will be constant once again. Thus during the startup phase of an induction motor the stator voltage and stator current will be out of phase, and the phase displacement between the two is proportional to the percentage of synchronous speed at a given time.

The following shows this relationship mathematically:

For any inductive circuit, current lags voltage by an angle $\phi$, where $$\phi = \cos^{-1} R/Z \qquad (1)$$

and
R = resistance
Z = impedance = $(R^2 + X_L^2)^{\frac{1}{2}}$, for reactance $X_L$.

For the rotor, this angle $\phi$ from (1)

$$\phi = \cos^{-1} R_r/Z_r \qquad (2)$$

where $$Z_r = (R_r^2 \times S^2 X_{ro}^2)^{\frac{1}{2}} \qquad (3)$$

$R_r$ = rotor resistance
$X_{ro}$ = rotor leakage reactance at standstill
$SX_{ro}$ = rotor dynamic reactance with motor slip S accordingly from (2) and (3)

$$\phi_r = \tan^{-1} sX_{ro}/R_r \qquad (4)$$

and the rotor current and voltage phase displacement is dependant on slip. This does not change after referral to the stator, since rotor impedence is referred to the stator by a constant factor:

$$I_s Z^1_r = I_r Z_r K \qquad (5)$$

where
$I_s$ = stator current
$Z^1_1$ = rotor impedance referred to stator
$I_r$ = rotor current
$Z_r$ = rotor impedance
K = 'Turns' ratio of stator induced magnetic field in R.P.M. to rotor speed in R.P.M. = $N_s/N_r$ and slip $S = {(N-N_r)}/N_s$ from (5):

$$Z^1 r = I_r/I_s\ Z_r K = K^2 Z_r$$

and rotor impedance is referred to the stator by a constant $K^2$.

The dependance of the phase displacment on slip is however not linear, since not only $X_{ro}$ but also rotor voltage ($E_r$) varies with slip.

Figure 1:
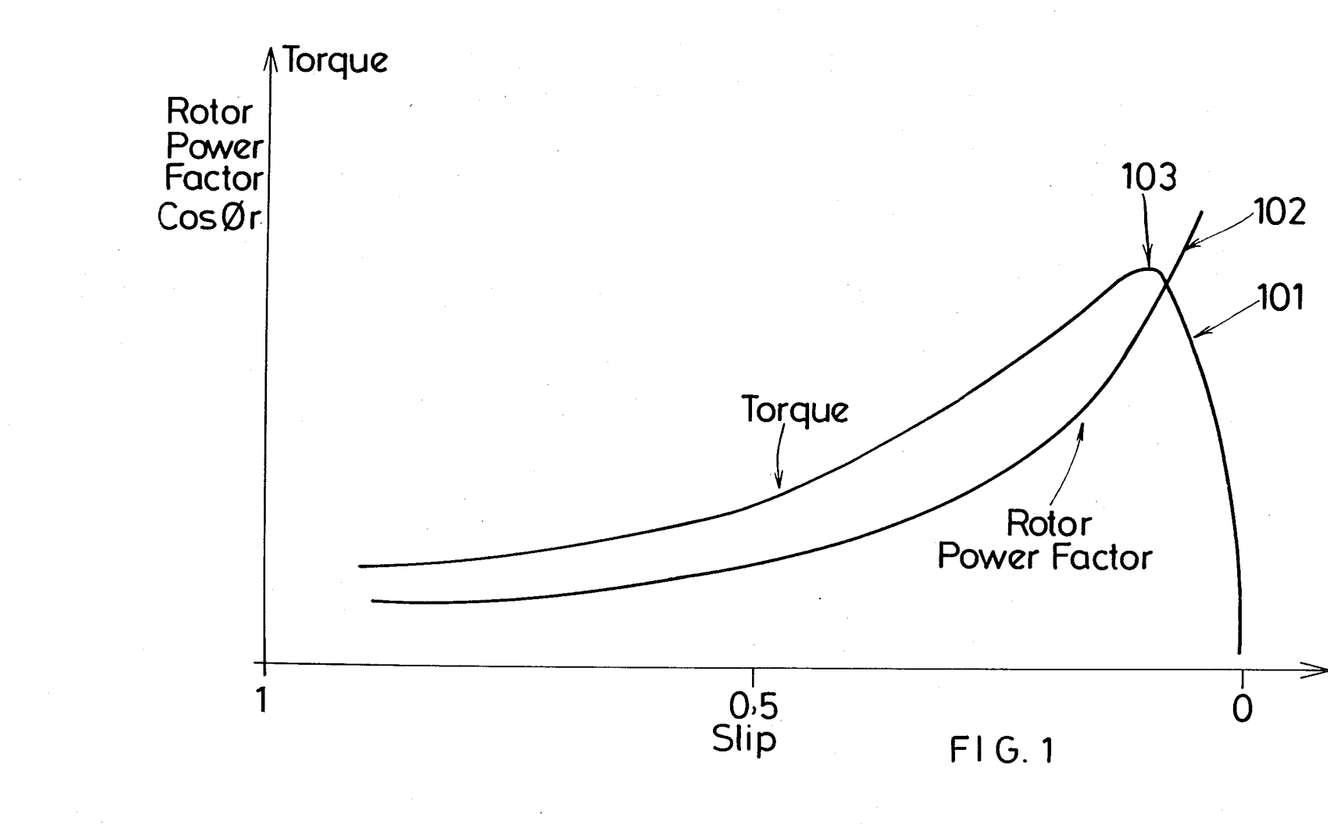
FIG. 1 is a graph of torque and rotor power factor, against percentage synchronous speed.

FIG. 1 shows the well known speed torque curve 101 for an induction motor, and also the rotor power factor curve 102 against motor slip. Maximum torque occurs at position 103 on the curve 101.

Figure 2:
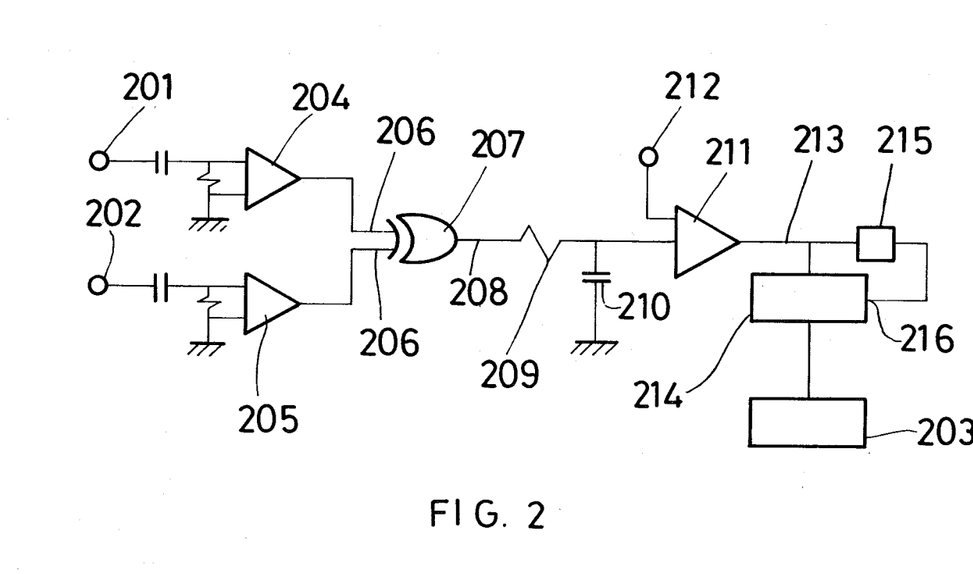
FIG. 2 is a block circuit diagram of a simple embodiment of the invention

Referring to FIG. 2, a simple stall detection apparatus is shown for protecting an electric induction motor (not shown), having stator voltage taken to a position 201 and having a voltage representing the stator current taken to a position 202. The motor is connected to a power supply which may be open-circuited by a trip device 203. Each of the stator voltage and current signals at positions 201 and 202 are connected respectively to an operational amplifier 204 and 205 through a capacitor resistor network to a non-inverting output at the output of the operational amplifier. The biasing of the input to the operational amplifiers is such that any positive voltage signal will cause the output to go positive and as the negative going signal at the input passes zero, the amplifier output will also switch to zero. Both of the operational amplifiers 204 and 205 are biased to switch at or around the same zero voltage position, and thus phase differences between their input will be reflected in their outputs. The output will of course be square waves.

Each of the operational amplifiers outputs is taken to one of two input 206 of a dual input EXCLUSIVE-OR gate 207, which has its output 208 taken through a resistor 209 and capacitor 210 to ground, with the junction of the resistor and capacitor being taken to one input of a comparator 211 which has the other input taken to a reference value 212. The comparator output 213 is connected to activate a timer 214 which is connected to activate the trip device 203 after a predetermined time period during which it has been counting. A flip flop 215 is connected from the output 213 to the reset input 216 of the timer.

In use, the square wave output from the operational amplifiers 204 and 205 are fed into the EXCLUSIVE-OR gate 207, and this gate output 208 will only produce a pulsed wave form when pulses from one of the inputs, but not both nor neither of the inputs, are present. It will be appreciated that as the vertical state of voltage and current moves toward a very small phase difference, the machine is accordingly moving towards its synchronous speed, and the square wave inputs to the EXCLUSIVE-OR gate 207 will be increasingly more in phase, and thus the pulsed output from the EXCLUSIVE-OR gate at 208 will have a smaller and smaller duty cycle. The output from the EXCLUSIVE-OR gate, is integrated by the resistor 209 and capacitor 210, to give an average value, and thus the greater the phase displacement the greater the output on line 208, and vice versa.

This integrated value is available at the input to the comparator 211, which will compare it to a predetermined voltage limit set at position 212. If the integrated input to the comparator 211 is greater than voltage limit set at 212, the output 213 of the comparator 211 will go high. The voltage set at 212 is taken to represent a voltage of a predetermined maximum allowable phase displacement, or percentage synchronous speed, for a particular motor. If the phase displacement measured is greater than that allowed, the high output along line 213 will activate the timer 214 which will commence timing. If the output 213 persists for a predetermined period, the timer will produce an output to activate the trip device 203 and cut off the power to the motor. If the timer has not finished counting for the predetermined time during which time the output 213 goes low as a result of an improvement in the phase displacement, the flip flop 215 which was previously set to zero by the high output on 213, will now change and reset the timer to zero.

Clearly it is also possible in the crudest form of the invention to connect the operational amplifier 213 directly to a trip device, so that the machine will simply trip out if the phase displacement is too bad. Such a device would of course have to be disabled at start up to allow the motor time to react. The choice of the time period for the timer 214 is a matter of design, and is preferably made to be settable by a user.

Figure 3:
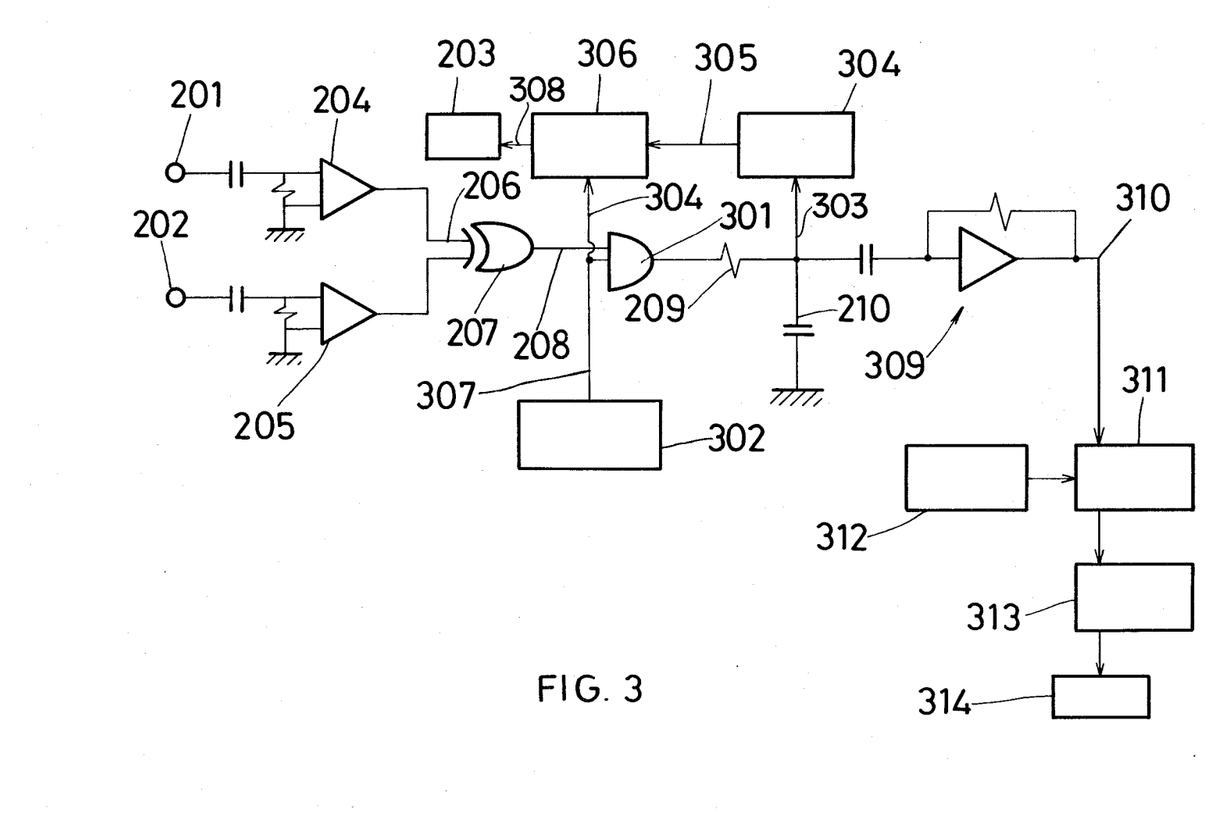
FIG. 3 is a diagrammatic circuit of an alternative embodiment of the invention.

Referring now to FIG. 3, an alternative embodiment of the invention is shown. The same input system from the motor is used as described with reference to FIG. 2, and the same numerals in FIG. 3 denote the same elements as described with reference to FIG. 2.

However, in this case, the output 208 from the EXCLUSIVE-OR gate 207 is taken to one input of an AND gate 301, and the AND gate output is taken through the integrating resistor and capacitor combination 209 and 210 as previously described.

The other input to the AND gate 301 comes from a start detector 302 which is connected to the motor to detect a start condition. This is done preferably by sensing the load current and if the load current commences at a value which is less than 10% of the overload maximum, and increases to substantially the overload maximum within 100 msec, the start detector will indicate a start by a positive logic signal taken to the other input of the dual AND gate 301. The start detection signal is reset when load current drops below rated full load.

The voltage over the capacitor 210 is taken via line 303 to a level detector 304 which can detect when the voltage over the capacitor is at a particular level, and on so detecting, give an inhibit signal along line 305 to a timer 306. The timer 306 also receives an input signal along line 307 from the start detector output which passes to the AND gate 301 as described above. The timer can activate the trip switch 203 via line 308 to cut off the motor power.

A differential amplifier indicated generally at 309 has its input connected to the capacitor voltage from line 303. The output of the differential amplifier, representing at position 310 the rate of change of the voltage over capacitor 210, is taken into an analogue calculator 311 which has an input from a conventional thermal memory 312 and an output into a level detector 313. The level detector 313 is connected to activate a further trip switch 314 to cut off power to the motor.

In use, the pulsed output from gate 207, as previously described with reference to FIG. 2, is taken to the AND gate 9 which will only allow the output to pass if the other input thereto from the start detector 302 indicates that a start condition of the motor is present. When synchronous speed is almost reached, the voltage over the capacitor will drop to reach the particular level at which the level detector 304 will inhibit the timer 306. If the timer 306 is not inhibited within the allowable time, commencing from when it is activated by the start detector 302 along line 307, it will activate the trip switch 203. Should the timer be inhibited by the level detector, then synchronous speed will have been reached timeously, and the timer will be reset.

The differentiating amplifier 309 will differentiate voltage over the capacitor 210, and thus produce a signal proportional to the rate of change of synchronous speed, or in other words the acceleration of the motor.

The acceleration signal available at 310 is taken to analogue calculator 311 which has an input from the thermal memory 312. The thermal memory provides the thermal load for the time being of the motor, from which the analogue calculator can derive the time remaining before an unacceptably high overload condition will be reached, if the present rate of acceleration of the motor is maintained. This time is derived from the conventional exponential-time cooling curve for a thermal memory. If the motor is not accelerating at sufficient speed to enable it to reach the synchronous speed within the allowable time, the analogue calculator will have reached an analogue output signal which is detected by the level detector as a trip condition, and the trip switch 314 is activated.

Referring now to FIG. 3, a circuit diagram is shown illustrating circuitry of various elements of the embodiment of FIG. 2. The elements of the embodiment of FIG. 3 which are the same as those of the embodiment of FIG. 2, are the two phase input lines 206 taken to the EXCLUSIVE-OR gate 207, the output of which gate is taken directly integrating resistor 209 and capacitor 210. The junction of the resistor 209 and capacitor 210 is taken to a voltage follower 413. The voltage follower 413 has its output 414 taken to an input of a differential amplifier 415, with capacitor 416 in the input from line 414, and a feedback resistor 417 taken to the output 418 of the differentiating amplifier.

Figure 4:
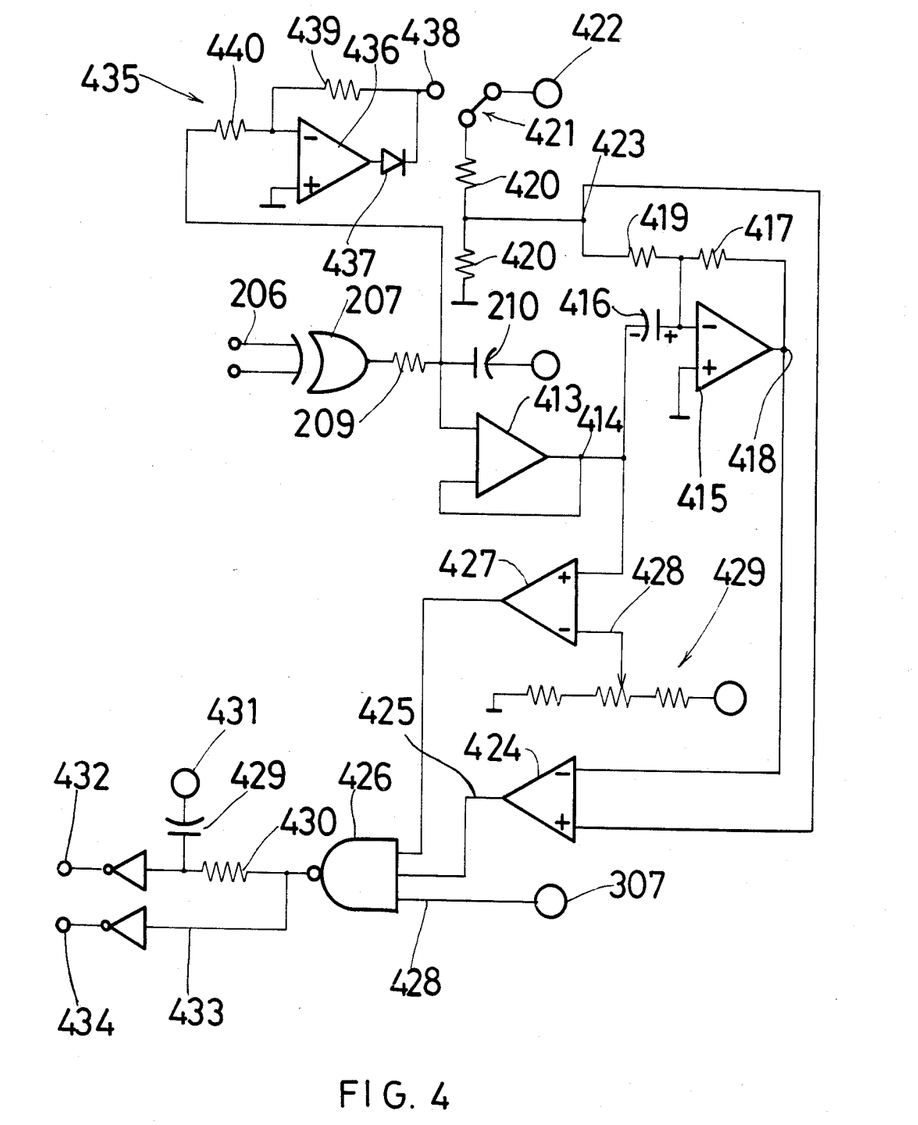
FIG. 4 is a circuit diagram of a further alternative embodiment of the invention.

An input resistor 419 to the amplifier 415 is connected to voltage dividing resistors 420 which are taken to a switch 421 having one contact thereof connected to a logical high at 422. The voltage dividing position 423 of the voltage divider 420 is taken to an input of a comparator 424, as is the differentiating amplifier output from 418.

The output 425 of the comparator 424 is taken to one input of a NAND gate 426. The output 414 of the voltage follower 413 is also taken into a comparator 427, which has a its other input 428 tapped from a voltage divider 429. The output of the comparator 427 is taken as an input to the NAND gate 426. A third input 28 of the NAND gate, is taken from the output line 307 of the start detector 302 (not shown), as envisaged in the embodiment of FIG. 3. The NAND gate output 433 passes through a resistor-capacitor timer comprising capacitor 429 and resistor 430, connected to a logical high at 431, and from there through to a trip device 432 for tripping the motor. The output line 433 is also taken, from a position before the timer, to a stall indicator 434 for visual indication of stall.

A level detector 435 comprises an operational amplifier 436, with the output taken through a diode 437 to the other contact 438 of the switch 421.

The amplifier 436 is connected in a high gain configuration with feedback resistor 439 and input resistor 440. The input through resistor 440 is taken from the conjunction between the resistor 411 and capacitor 412, which is also the input to the voltage follower 413.

In use, a phase difference signal will be present at the junction of resistor and capacitor 209 and 210, and is then fed through the voltage follower 413 and into the comparator 427. Clearly only if the phase difference signal is greater than the signal from the voltage divider 429, will the output from the comparator 427 be a logical high. The reference signal from the voltage divider 429 has a value chosen to represent a predetermined maximum allowable phase difference.

The comparator output is taken to the NAND gate 426, and a trip signal will only issue from the NAND gate if both the output of the comparator 424, as well as the start enable signal from 307, are present.

The output from the differential amplifier 415 represents the rate of change of the phase difference from the output 414 of the voltage follower. The rate of change signal must be greater than the signal at the dividing point 423 of the dividing resistors 420, in order for the comparator 424 to have a high output. If the other two inputs to the NAND gate 426 are high, the only way a trip signal from the NAND gate can be prevented, is for the comparator 424 output to be high as well. For this to occur, the rate of change signal on line 418 must be greater than the voltage divider signal at 423. This latter signal at 423 is chosen to represent a desired minimum rate of change, or acceleration, signal.

This description applies to the use of the switch 421 in contact with the logical high 422 as shown. The voltage level at 423 is selected to represent the slope of a straight line taken as an approximation of the latter half of the curve of the rotor power factor, shown in dotted lines 41 in FIG. 1. This portion of the power factor curve is selected as being suitable for use with wound rotor machines which have external reactances for starting. Such machines commence starting at a maximum torque and thus motor operation within the parameters of the portion of the curve prior to the approximate maximum torque position, is never occurs in practice with such a motor. The phase difference displacement, or power factor, can be approximated as being linear in this case also because the switching in of external starting and rotor reactances which are normally matched for a maximum torque at a slip of one.

For general use on squirrel cage induction motors, the switch 421 should be switched over to make the contact 438.

In this case, the operational amplifier 436 will continously vary the voltage setting at voltage dividing position 423, which represents a desired minimum motor acceleration.

When the phase displacement is large, the output of amplifier 436 will be low since it is connected in inverting mode. As the phase displacement decreases, so will the amplifier output 436 decrease; this means that the nearer to synchronous speed the motor is, the greater is the minimum acceleration limit that the motor must exceed to avoid a stall condition signal at the output of comparator 424. This method allows the limit chosen to follow the curve 102 of FIG. 1 as near as is possible, since the rotor power factor (phase difference) is used to set it.

However, both an insufficient acceleration and an excessive phase difference must be present before a final stall condition will be indicated by the NAND gate 426.

The timer comprising resistor 430 and capacitor 429, ensures that the final stall condition is present for a predetermined stall time before the motor is tripped out.

Thus if there is a large phase displacement (high slip) but the motor is accelerating satisfactorily, no stall condition will be registered, and likewise if there is poor acceleration, but a low slip, no stall condition will be registered.

In this embodiment the stall protection is limited to start-stall protection by the start enable signal 307 at line 428. Clearly this could be dispensed with.

It will be apparant that the minimum acceleration limit at position 423 can be made to vary continously with, and be directly proportional to, a thermal load signal from thermal memory 313. The proportioned thermal load signal would simply be connected directly to position 422.

It is considered that the invention provides a useful apparatus and method for detecting a start-stall condition in an induction motor.

Variations may be made to the above described embodiment without departing from the scope of the invention. For example, the stator voltage and stator current phase displacement may be measured by a variety of different known methods of phase displacement measurement, and the method of utilising the output signal from the phase comparator which is used, can vary widely as well.

It will also be appreciated that whilst the stator voltage and current is used to provide the phase difference signal, the phase difference is in fact that of the rotor referred to the stator by a constant factor. Since access to the stator is assured, but not to the rotor, it is the more convenient to use. Reference to phase difference between stator voltage and current is to be understood to include phase difference between rotor voltage and current.

Further the stall detection method and apparatus can optionally use only the rate of change of phase difference as the indicating parameter for a stall condition.

What I claim as new and desire to secure by Letters Patent is:

1. A stall detection apparatus for an electric induction motor, comprising:
   means for monitoring the phase of the stator current and voltage;
   a phase comparator for producing an output signal which is proportional to the phase difference between stator current and voltage; and
   electronic means for utilizing the output signal to ascertain a stall condition and produce a stall condition signal, including a timer activated by said stall condition signal to produce a final stall condition signal if the first stall condition signal persists for a predetermined period measured by said timer, there being resetting means for resetting the timer if said first signal does not persist for said predetermined period.

2. A method of detecting a stall condition in an electric induction motor, comprising:
monitoring stator current and voltage of the motor;
producing an electrical signal proportional to the phase difference for the time being between the monitored stator current and voltage;
detecting a start up condition of the motor if load current demand increases from a predetermined value less than motor overload maximum, to the said overload maximum within a predetermined time;
activating a timing means on detection of a start up condition;
determining whether the phase difference as representative of percentage synchronous speed of the motor decreases from a start-up value to a value just above the said predetermined maximum with a predetermined period measured by the timing means, the said value and time period being selected to represent a safe operating percentage of synchronous speed reached within an allowable time; and
activating the stall condition signal if the said value is not reached within the time period.

3. A method as claimed in claim 2 including the steps of:
electronically determining the rate of change of the said phase difference, and determining whether it is less than a predetermined minimum value which is selected to represent a desired minimum motor acceleration limit; activating a second stall condition signal if the said rate of change is less than the predetermined miminum value; and,
activating a final stall condition signal if both the second and original stall condition signals are present.

4. A method as claimed in claim 3 including the steps of maintaining an electrical signal record of motor thermal load for the time being by accumulating and reducing a thermal memory, utilizing the thermal load signal to continously vary the desired minimum motor acceleration limit such that the greater the thermal load, the faster the desired minimum acceleration and vice versa.

5. A method as claimed in claim 3 in which the desired minimum motor acceleration limit is varied in accordance with the phase difference signal, such that the lesser the phase difference the faster the desired minimum acceleration.

6. A method as claimed in claim 5 including the step of selectively switching between the continous variance of the minimum acceleration with phase difference, and a fixed predetermined minimum acceleration.

7. A method as claimed in claim 2 wherein the producing, comparing and activating steps include:
maintaining an electrical signal record of motor thermal load for the time being by accumulating and reducing a thermal memory;
electronically determining rate of change of said phase difference;
electronically calculating from the thermal record signal, at the rated cooling time for the memory, the time available before a thermal trip overload condition will exist;
electronically calculating whether at the determined rate of change the motor will reach a safe operating speed within the calculated time available; and,
activating a stall condition signal if the motor will not so reach operating speed.

8. A stall detection apparatus for an electric induction motor, comprising:
means for monitoring the phase of the stator current and voltage;
a phase comparator for producing an output signal which is proportional to the phase difference between stator curent and voltage;
electronic means for utilizing the output signal to ascertain a stall condition and produce a stall condition signal, including a level detector for producing a stall condition signal when said phase difference exceeds a predetermined maximum limit;
a motor start detector adapted to produce a start signal if motor load current demand increases from a predetermined value less than the motor overload maximum, to the said overload maximum within a predetermined time; and
a timing means connected to be activated by the start signal, the level detecting means being adapted to be disabled by the timing means for a predetermined period, the predetermined maximum phase difference and time period being selected to represent a safe operating percentage of synchronous speed reached within an allowable time.

9. A stall detection apparatus for an electric induction motor, comprising:
means for monitoring the phase of the stator current and voltage;
a phase comparator for producing an output signal which is proportional to the phase difference between stator curent and voltage;
electronic means for utilizing the output signal to ascertain a stall condition and produce a stall condition signal, including a level detector for producing a stall condition signal when said phase difference exceeds a predetermined maximum limit;
a differentiating means connected to receive the phase difference output signal and produce a signal representing rate of change of phase difference;
further level detecting means for activating a second stall condition signal if the rate of change signal is less than a predetermined minimum selected to represent a desired minimum motor acceleration limit; and
logic means for activating a final stall condition signal only if both the first and second stall condition signals are present.

10. A stall detection apparatus for an electric induction motor, comprising:
means for monitoring the phase of the stator current and voltage;
a phase comparator for producing an output signal which is proportional to the phase difference between stator curent and voltage;
electronic means for utilizing the output signal to ascertain a stall condition and produce a stall condition signal, including a level detector for producing a stall condition signal when said phase difference exceeds a predetermined maximum limit; and
a thermal memory for accumulating and reducing a record of the thermal load for the time being of the motor and producing a signal representing the record, this signal being connected to continuously vary the desired minimum motor acceleration level such that the greater the thermal load the faster the desired minimum accleration limit and vice versa.

11. Apparatus as claimed in claim 9 in which the phase difference signal is connected to continously vary the desired minimum motor acceleration limit such that the lesser the phase difference the faster the desired miminum acceleration limit.

12. Apparatus as claimed in claim 11 including switching means for switching the desired minimum acceleration between variance with phase displacement and a fixed predetermined minimum acceleration limit.

13. A stall detection apparatus for an electric induction motor, comprising:
means for monitoring the phase of the stator current and voltage;
a phase comparator for producing an output signal which is proportional to the phase difference between stator curent and voltage;
electronic means for utilizing the output signal to ascertain a stall condition and produce a stall condition signal, including a differentiating means connected to receive the phaae difference output signal and produce a signal representing rate of change of phase difference; and,
level detecting means for activating a stall condition signal if the rate of change signal is less than a predetermined minimum selected to represent a desired minimum motor acceleration limit.

14. Apparatus as claimed in claim 8 including:
a thermal memory for accumulating and reducing a record of the thermal load for the time being of the motor and producing a signal representing the record;
a differentiating means connected to receive the phase difference output signal and produce a signal representing rate of change of phase difference;
electronic calculating means for determining from the thermal record signal, at the rated cooling for the memory, what time is available before a thermal overload trip condition will exist; and
electronic calculating means for determining whether, from the rate of change signal, the motor will reach a safe operating speed within the calculated time available, and for producing a stall condition signal if it will not.

* * * * *